United States Patent
Rao et al.

(10) Patent No.: US 9,047,331 B2
(45) Date of Patent: Jun. 2, 2015

(54) SCALABLE ROW-STORE WITH CONSENSUS-BASED REPLICATION

(75) Inventors: Jun Rao, San Jose, CA (US); Eugene J. Shekita, San Jose, CA (US); Sandeep Tata, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 13/092,028

(22) Filed: Apr. 21, 2011

(65) Prior Publication Data

US 2012/0271795 A1    Oct. 25, 2012

(51) Int. Cl.
G06F 17/30    (2006.01)

(52) U.S. Cl.
CPC .... *G06F 17/30345* (2013.01); *G06F 17/30575* (2013.01)

(58) Field of Classification Search
USPC .......................................................... 707/613
See application file for complete search history.

(56) References Cited

U.S. PATENT DOCUMENTS

| | | | |
|---|---|---|---|
| 5,519,855 A | | 5/1996 | Neeman et al. |
| 5,924,094 A | * | 7/1999 | Sutter ................................. 1/1 |
| 5,966,706 A | * | 10/1999 | Biliris et al. ........................ 1/1 |
| 6,587,860 B1 | * | 7/2003 | Chandra et al. ............... 707/620 |
| 2007/0143299 A1 | * | 6/2007 | Huras et al. ..................... 707/10 |
| 2007/0174661 A1 | * | 7/2007 | Peddada ............................ 714/4 |
| 2007/0239797 A1 | | 10/2007 | Cattell et al. |
| 2008/0298256 A1 | * | 12/2008 | Matsubara et al. ............ 370/242 |
| 2009/0157766 A1 | * | 6/2009 | Shen et al. ..................... 707/202 |
| 2010/0114826 A1 | * | 5/2010 | Voutilainen et al. .......... 707/638 |

OTHER PUBLICATIONS

Cecchet et al. "Middleware-based Database Replication: The Gaps Between Theory and Practice" Proceedings of the 2008 ACM SIGMOD International Conference on Management of Data, (Jun. 2008), pp. 739-752.
Chang et al. "Bigtable: A Distributed Storage System for Structured Data" ACM Transactions on Computer Systems, vol. 26, No. 2, Article 4, (Jun. 2008), 26 pages.
Helland et al. "Life Beyond Distributed Transactions: An Apostate's Opinion" 3rd Biennial Conference on Innovative DataSystems Research (CIDR), (Jan. 2007), pp. 132-141.
Kallman et al. "H-Store: A High-Performance, Distributed Main Memory Transaction Processing System" Proceedings of the VLDB Endowment, vol. 1, Issue 2, (Aug. 2008), pp. 1496-1499.
Kraska et al. "Consistency Rationing in the Cloud: Pay only when it matters" Proceedings of the VLDB Endowment, vol. 2, Issue 1, (Aug. 2009), pp. 253-264.
Lakshman et al. "Cassandra—Structured Storage System on a P2P Network" Proceedings of the 28th ACM symposium on Principles of distributed computing, (Aug. 2009), 1 page.

(Continued)

*Primary Examiner* — Ajay Bhatia
*Assistant Examiner* — Kurt Mueller
(74) *Attorney, Agent, or Firm* — Jeffrey T. Holman

(57) ABSTRACT

A method for updating a scalable row-store, including: receiving an update to a key within a range of keys in a database table, wherein the database table is distributed across nodes in a cluster of computing devices; and replicating the update over a group of the nodes using a consensus-based replication algorithm, wherein the replication algorithm includes completing the update in response to receiving acknowledgement messages from a majority of the nodes in the group indicating that the majority has received notification of the update.

14 Claims, 5 Drawing Sheets

(56) References Cited

OTHER PUBLICATIONS

Lomet et al. "Locking Key Ranges with Unbundled Transaction Services" Proceedings of the VLDB Endowment, vol. 2, Issue 1, (Aug. 2009), pp. 265-276.

Lomet et al. "Unbundling Transaction Services in the Cloud" 4th Biennial Conference on Innovative Data Systems Research (CIDR), (Jan. 2009), 10 pages.

Mohan et al. "Recovery and Coherency-Control Protocols for Fast Intersystem Page Transfer and Fine-Granularity Locking in a Shared Disks Transaction Environment" Proceedings of the 17th International Conference on Very Large Data Bases, (Sep. 1991), pp. 193-207.

Wang et al. "Data Replication in a Distributed Heterogeneous Database Environment: An Open System Approach" IEEE 13th Annual International Phoenix Conference on Computers and Communications, (Apr. 1994), pp. 315-321.

Amossen "Vertical Partitioning of Relational OLTP Databases using Integer Programming" ICDE Workshops, (2010), pp. 93-98.

"Transforming the Economics of Data Warehousing with Cloud Computing" Vertica Systems Inc., (Nov. 2008), 9 pages.

Pandey et al. "An Autonomic Cloud Environment for Hosting ECG Data Analysis Services" available at: http://www.cloudbus.org/reports/HeartBeatAnalysisOnCloud2010.pdf, last accessed Apr. 21, 2011, 9 pages.

Abadi "Data Management in the Cloud: Limitations and Opportunities" Bulletin of the IEEE Computer Society Technical Committee on Data Engineering, (2009), 10 pages.

Russom "Next Generation Data Warehouse Platforms" Oracle, The Data Warehouse Insider, (2009), available at: http://www.oracle.com/us/solutions/datawarehousing/040119.pdf?ssSourceSiteId=ocomes, last accessed Apr. 21, 2011, 35 pages.

Rao et al. "Using Paxos to Build a Scalable, Consistent, and Highly Available Datastore" Proceedings of the VLDB Endowment, vol. 4, Issue 4, (Jan. 2011), 12 pages.

* cited by examiner

SCALABLE ROW-STORE WITH CONSENSUS-BASED REPLICATION

BACKGROUND

Many Internet and cloud computing applications have scaling requirements for transactional workloads that exceed the capabilities of enterprise databases. Various methods of structuring a database may be used to meet the scaling requirements. One conventional method includes sharding on a cluster of commodity servers, in which each node in the cluster is responsible for a shard (or part) of the data and runs its own independent instance of database software. Other partitioned database architectures have emerged that automate sharding and load balancing across nodes to make sharding easier. These architectures typically use key-based hash or range partitioning to assign data to nodes in the cluster.

In addition to aggressive scaling requirements, many Internet and cloud computing applications also need to be continuously available. However, on a large cluster of commodity servers with hundreds or thousands of nodes, failures are inevitable. Consequently, replication protocols may be used to allow high availability and fault tolerance in the database. Such strategies tend to experience tradeoffs among consistency and availability.

SUMMARY

Embodiments of a system are described. In one embodiment, the system is a scalable row-store system. The system includes: a database table distributed across a plurality of nodes in a cluster of computing devices; a replicator to replicate an update to a key within a range of keys in the database table over a group of the nodes using a consensus-based replication algorithm, wherein the replication algorithm is configured to complete the update in response to receiving acknowledgement messages from a majority of the nodes in the group indicating that the majority has received notification of the update. Other embodiments of the system are also described.

Embodiments of a computer program product are also described. In one embodiment, the computer program product includes a computer readable storage device to store a computer readable program, wherein the computer readable program, when executed by a processor within a computer, causes the computer to perform operations for updating a scalable row-store. The operations include: receiving an update to a key within a range of keys in a database table, wherein the database table is distributed across nodes in a cluster of computing devices; and replicating the update over a group of the nodes using a consensus-based replication algorithm, wherein the replication algorithm includes completing the update in response to receiving acknowledgement messages from a majority of the nodes in the group indicating that the majority has received notification of the update. Other embodiments of the computer program product are also described.

Embodiments of a method are also described. In one embodiment, the method is a method for updating a scalable row-store. The method includes: receiving an update to a key within a range of keys in a database table, wherein the database table is distributed across nodes in a cluster of computing devices; and replicating an update over a group of the nodes using a consensus-based replication algorithm, wherein the replication algorithm includes completing the update in response to receiving acknowledgement messages from a majority of the nodes in the group indicating that the majority has received notification of the update. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
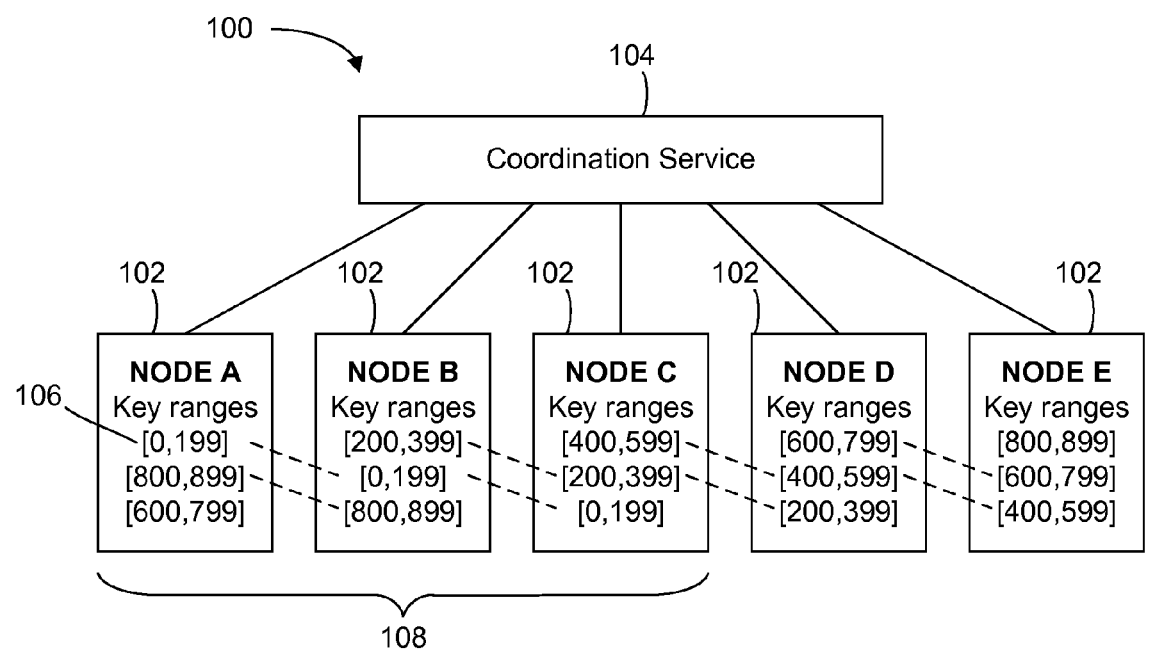
FIG. 1 depicts a schematic diagram of one embodiment of a scalable row-store system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for updating a scalable row-store. More specifically, the system uses a consensus-based replication algorithm to replicate updates or modifications to keys in a database table distributed across nodes. In one embodiment, the database table is distributed using a range partitioning scheme, such that each node in the database is responsible for one or more ranges of keys in the database table. In other embodiments, the database table may be distributed using any partitioning scheme that distributes the table among multiple nodes in a database. Additionally, the system is capable of recovering after node failures to maintain sufficient accuracy and consistency for adequate performance in a cloud or other database environment.

Conventional systems implement sharding in a variety of ways, some of which require manual processes that can be difficult to maintain and to load balance throughout the nodes. Other architectures automate the sharding and load balancing process through key-based hash or range partitioning schemes to assign data to nodes in the cluster. Many conventional systems, manual or automated, implement replication processes to provide fault tolerance in case of failure, such as master-slave replication. However, master-slave replication may limit database availability during failure of a node in a master-slave pair. Implementing a consensus-based replication algorithm can improve availability of the nodes during node failure while also providing sufficient consistency of data stored on the nodes for large scale or scalable databases.

FIG. 1 depicts a schematic diagram of one embodiment of a scalable row-store system 100. In one embodiment, the scalable row-store system 100 includes several nodes 102 connected to a coordination service 104. The scalable row-store system 100 may include other components, depending on the intended use of the row-store system 100. For example, the row-store system 100 may include or be part of a large scale database, such as in a cloud computing environment or an Internet database containing large amounts of data. The system 100 may alternatively be used in other environments in which a scalable row-store system 100 may be advantageous.

In one embodiment, the coordination service 104 is a fault tolerant, distributed coordination service 104. The coordination service 104 may be used to provide a centralized location to store metadata and manage certain events within the system 100, such as node failure. The coordination service 104 may be capable of implementing distributed locks, barriers, group membership, or other possible attributes of large scale databases. In one embodiment, the coordination service 104 primarily receives "heartbeat" messages from the nodes 102 to track operability of each of the nodes 102. Because this may be the primary responsibility of the coordination service 104, a single coordination service 104 may be used to support a cluster containing thousands of nodes 102. In one embodiment, the coordination service 104 is able to detect failures in nodes 102 within the system 100, and may elect leader nodes for a cohort in response to a failure of a leader node, as described herein. Other embodiments may use the coordination service 104 to implement additional functionality in the database, may utilize multiple coordination services 104, or may use other components or methods of managing the operability of the database.

In one embodiment, the nodes 102 are commodity servers, though the nodes 102 may include any type of computing device or system. Each node 102 may store data for a specified range 106 of a database table in a key-based range partitioning scheme. The range partitioning scheme allows the system 100 to distribute the database table across many nodes 102. Groups of nodes 102, also called cohorts 108, may share a range 106 of data from the database table to provide for failure recovery and availability of the data within the system 100.

In one embodiment, each node 102 stores a certain range 106 of keys, such as rows or entries, for the database table. Each node 102 may be part of one or more cohorts 108, such that each node 102 may be responsible for several key ranges 106. Any number of nodes 102 may be in a cohort 108. In the embodiment of FIG. 1, the coordination service 104 is connected to nodes 102 A, B, C, D, and E. The nodes 102 are responsible for keys [0, 899]. Other coordination services 104 within the database may include other nodes 102 that are responsible for other ranges 106 of keys in the same database table. Other embodiments may include any number of nodes 102, and may include thousands of nodes 102. Each cohort 108 is responsible for a portion of the total key range 106 corresponding to the coordination service 104. This allows the database to store the keys on multiple nodes 102 in case of node failures.

The number of nodes 102 in a cohort 108 may be determined by a replication number. Each node 102 is assigned a base key range 106, which is then replicated on the next N−1 nodes 102, where N is the replication number. For example, if N=3, as in the embodiment of FIG. 1, then each cohort 108 contains three nodes 102—the first node 102 and the next two nodes 102 on which the base key range 106 is replicated. As described in further detail herein, the system 100 uses a consensus-based replication algorithm to replicate data within the cohorts 108.

Because the present embodiment has only five nodes 102, and each cohort 108 includes three nodes 102, each of the nodes 102 is used in multiple cohorts 108 in order to cover the entire range 106 of keys. Each of the nodes 102 is also responsible for three key ranges 106. The cohort 108 of nodes A, B, and C is responsible for a key range 106 [0, 199], such that all of the nodes 102 in the cohort 108 are responsible for the key range [0, 199] and store the data corresponding to each key. The cohort 108 of nodes B, C, and D is responsible for the key range [200, 399]. The cohort 108 of nodes C, D, and E is responsible for the key range [400, 599]. The cohort 108 of nodes D, E, and A is responsible for the key range [600-799]. The cohort 108 of nodes E, A, and B is responsible for the key range [800-899]. Consequently, node A is responsible for key ranges [0, 199], [800, 899], and [600, 799, node B is responsible for key ranges [200, 399], [0, 199], [800, 899], etc. While the embodiment of FIG. 1 depicts a coordination service 104 that manages five nodes 102 responsible for a particular range 106 of keys in a database table, the row-store system 100 may include any number of coordination services 104 managing any number of nodes 102 that are responsible for any number and size of key ranges 106.

Figure 2:
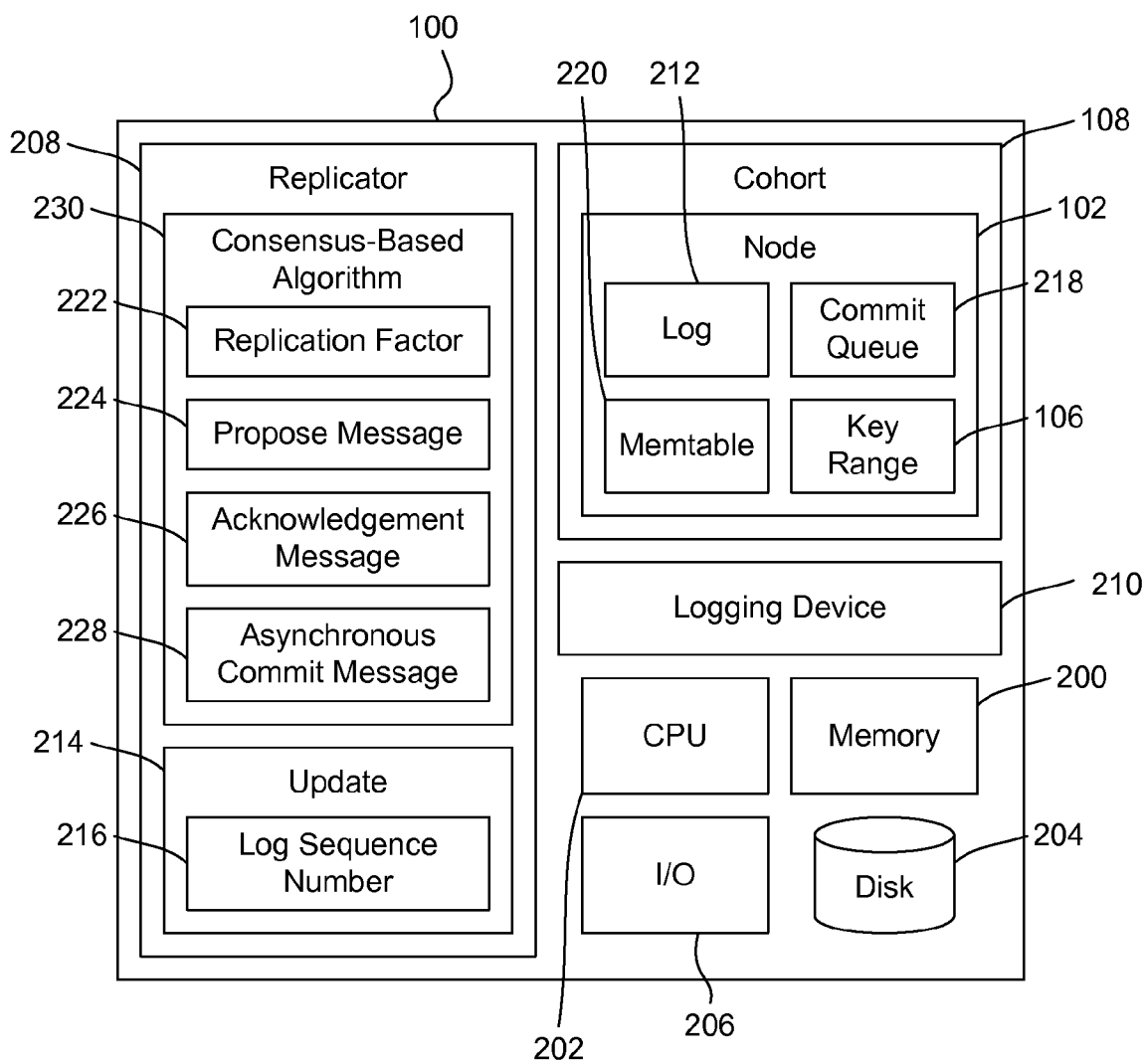
FIG. 2 depicts a schematic diagram of one embodiment of the scalable row-store system of FIG. 1.
Figure 5:
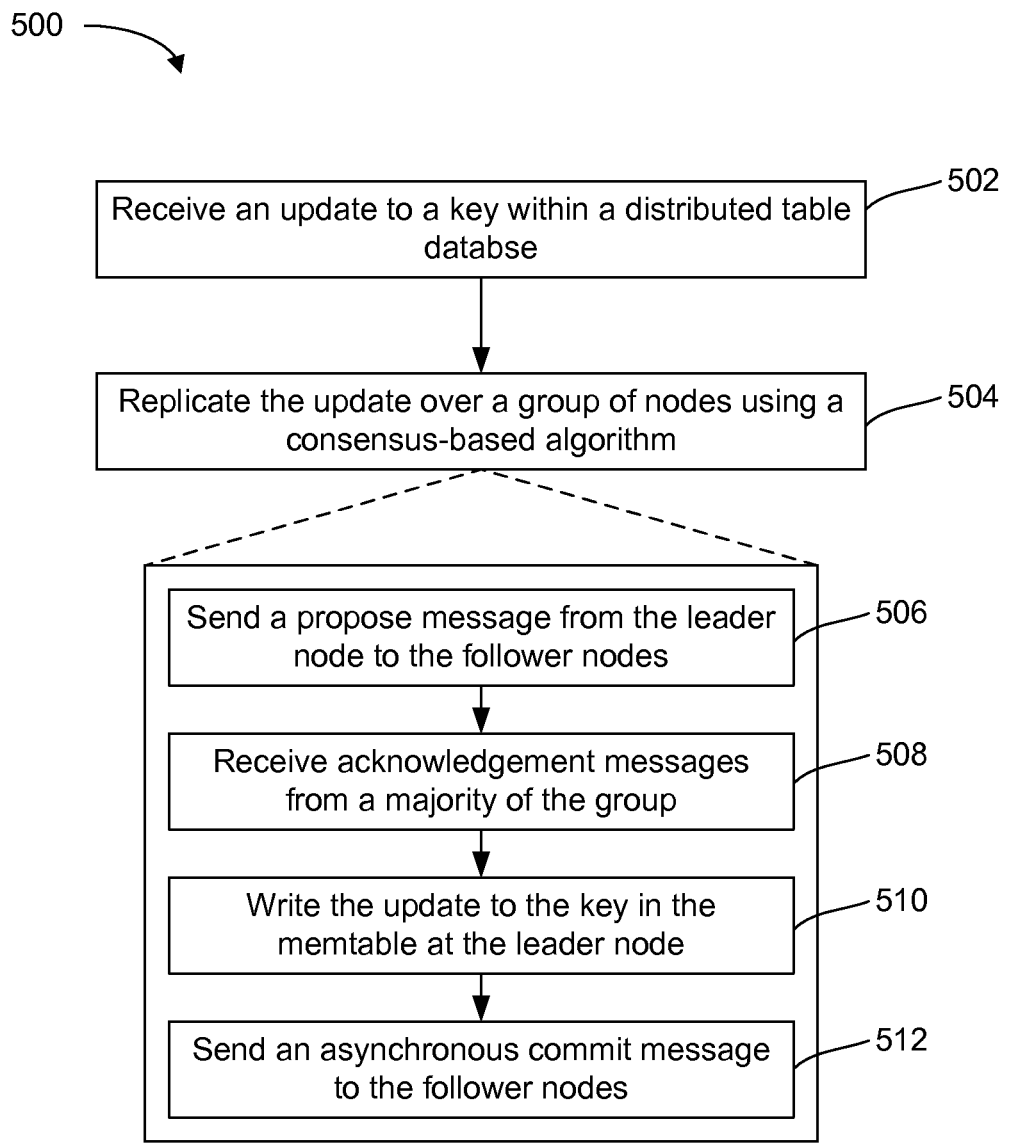
FIG. 5 depicts a flow chart diagram of one embodiment of a method for updating a scalable row-store.

FIG. 2 depicts a schematic diagram of one embodiment of the scalable row-store system 100 of FIG. 1. The depicted scalable row-store system 100 includes various components, described in more detail below, that are capable of performing the functions and operations described herein. In one embodiment, at least some of the components of the row-store system 100 are implemented in a computer system. For example, the functionality of one or more components of the row-store system 100 may be implemented by computer program instructions stored on a computer memory device 200 and executed by a processing device 202 such as a CPU. The row-store system 100 may include other components, such as a disk storage drive 204, input/output devices 206, one or more nodes 102, a replicator 208, and a logging device 210. Some or all of the components of the row-store system 100 may be stored on a single computing device or on a network of computing devices. The row-store system 100 may include more or fewer components than those depicted herein. In some embodiments, the row-store system 100 may be used to implement the methods described herein as depicted in FIG. 5.

The row-store system 100 includes a database table distributed across multiple nodes 102. The system 100 may include any number of nodes 102. Each node 102 may have access to a log 212. In one embodiment, the log 212 is a shared write-ahead log 212 to which each of the nodes 102 in every cohort 108 has access. The shared log 212 may be stored on the logging device 210 connected to each of the nodes 102. A dedicated logging device 210 shared by the nodes 102 may improve performance. The nodes 102 write to the log 212 using uniquely identified logging sequence numbers 216 for each update 214 to the log 212. The log 212 at the logging device 210 may include an SSTable, which is a database table structure that is indexed by key and column name. In some embodiments, the log 212 may include more than one SSTable or may include the capability to merge several SSTables. In one embodiment, the nodes 102 have local logs 212 to which the nodes 102 may write temporary data or node-specific data.

The nodes 102 may also include a commit queue 218. In one embodiment, the commit queue 218 is stored in memory on the node 102. The commit queue 218 may include an ordered list of data that has been proposed but not yet committed to a memtable 220. The memtable 220 is a cache of data rows stored at the node 102 that is written to the SSTable on the logging device 210 when the memtable 220 is full.

Each node 102 is also assigned at least one key range 106 for which the node 102 is responsible. The key range 106 may be selected according to the number of nodes 102 in the row-store system 100 and the number of rows or keys in the database table. In some embodiments, the system 100 may use other factors in determining which key range 106 is assigned to each node 102. The node 102 may also be responsible for additional key ranges 106 according to the cohort 108 in which the node 102 is located. As described herein, the number of nodes 102 in a cohort 108 may be determined by a replication factor 222. The replication factor 222 may also determine how many key ranges 106 are assigned to each node 102 with a single cohort 108. In some embodiments, the nodes 102 in a cohort 108 all share the same number of key ranges 106 as nodes 102 within the cohort 108. In one embodiment, each cohort 108 includes one leader node and at least one follower node, as described herein.

The row-store system 100 includes a replicator 208 for replicating that uses a consensus-based replication algorithm 230 to replicate the keys on the nodes 102. The replication algorithm 230 replicates a base key range 106 for one node 102 across other nodes 102 within the cohort 108 based on the replication factor 222. The replication algorithm 230 identifies the replication factor 222 before replicating the key ranges 106 or any updates 214 to the key. The replication factor 222 may determine how many additional key ranges 106 for which each node 102 is responsible, including the base key range 106. In one embodiment, the replication factor 222 is selected when setting up the database. In another embodiment, the replication factor 222 is selected based on the number of nodes 102 connected to a coordination service 104 at the time the replication factor 222 is determined.

In one embodiment, the replicator 208 elects a leader node for each cohort 108 in a leader election phase. Once a leader node has been elected, the leader node does not change unless there is a failure, and only the quorum phase of the replicator 208 is executed. In the quorum phase, the leader node sends a propose message 224 to write or otherwise complete an update 214 for a given key and the follower nodes 304 send an acknowledgement message 226 to the leader node. Each of the leader nodes and follower nodes 304 may append additional data corresponding to the update 214 to their local logs 212 and commit queues 218.

Because the replication algorithm 230 is consensus based, the leader node receives an acknowledgement message 226 from a majority of the follower nodes 304 (including the leader node itself) before the leader node commits the data to its memtable 220. The leader node then sends an asynchronous commit message 228 to the follower nodes 304 at any later time. The follower nodes 304 write the update 214 to their memtables 220 after receiving the asynchronous commit message 228. In one embodiment, the leader node sends the commit message 228 periodically. The update 214 is written to the memtable 220 and corresponds to a specified log sequence number 216 (LSN) which may be used for recovery. The LSN 216 may be assigned to the update 214 according to an order in which the update 214 was received by the system 100. The update 214 may be written to the memtables 220 in an order designated by the LSN 216.

Figure 3:
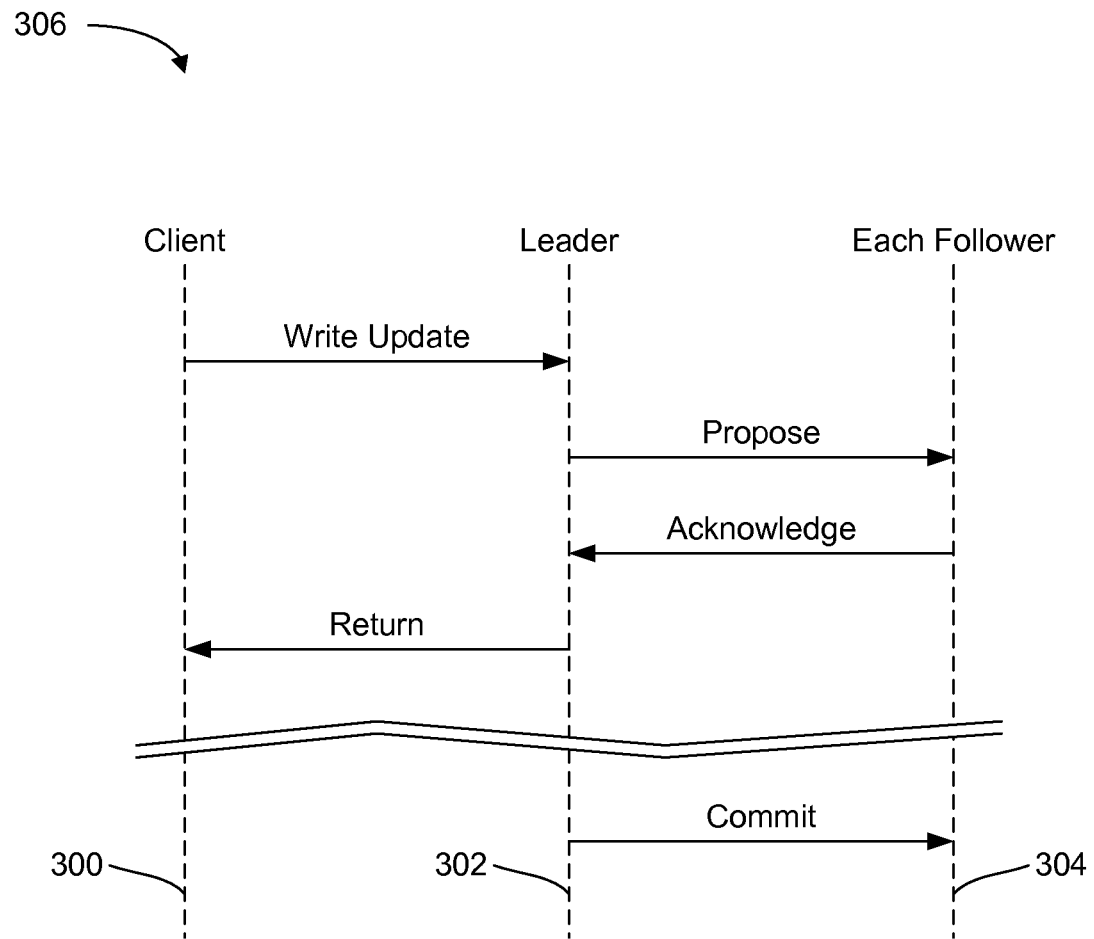
FIG. 3 depicts a flow chart diagram of one embodiment of a method for replicating an update across nodes.

FIG. 3 depicts a flow chart diagram of one embodiment of a method for replicating an update 214 across nodes 102. Although the method is described in conjunction with the row-store system 100 of FIG. 1, embodiments of the method may be implemented with other types of row-store systems 100.

When the system 100 receives the update 214 to write to a key in the database table from a client 300, the update 214 is routed 302 to the leader node 302 in the cohort 108 corresponding to the key range 106 in which the key is located. The leader node 302 appends a log record for the update 214 to its local log 212 and then initiates a log force to disk. In parallel with the log force, the leader appends the update 214 to its commit queue 218 and sends a propose message 224 for the update 214 to the follower nodes 304 in the cohort 108.

When the follower nodes 304 receive the propose message 224, the follower nodes 304 force a log record for the update 214 to disk, append the update 214 to their commit queue 218, and reply with an acknowledgement message 226 to the leader node 302. When the leader node 302 receives an acknowledgement message 226 from a majority of the follower nodes 304 (and the leader node 302), the leader node 302 applies the update 214 to its own memtable 220. In an embodiment containing three nodes 102 in a cohort 108, a majority includes the leader node 302 and one of the follower nodes 304. Therefore, the leader may apply the update 214 after receiving an acknowledgement message 226 from at least one of the followers. The leader node 302 also returns a response to the client 300 that the update 214 has been written to the database table.

In one embodiment, the leader node 302 periodically sends an asynchronous commit message 228 to the follower nodes 304 asking the follower nodes 304 to apply all pending writes up to a certain LSN 216 to their memtables 220. When the follower nodes 304 receive the commit message 228, the follower nodes 304 write all updates 214 from their commit queues 218 that have not yet been written up to the LSN 216 indicated in the commit message 228. The leader node 302 and follower nodes 304 may write the LSN 216 to local memory or logs 212 for recovery.

An asynchronous commit message 228 may result in more efficient communication between the leader node 302 and the follower nodes 304 because the leader node 302 may wait to send the commit message 228 until the leader node 302 is not performing other operations. The asynchronous commit message 228 also allows the system 100 to operate with timeline consistency. Because timeline consistent reads may be routed to any node 102 in the cohort 108, the reads may encounter a stale value for the updated key until the commit message 228 is processed. Reducing the interval between commit messages 228 may provide better consistency.

Figure 4:
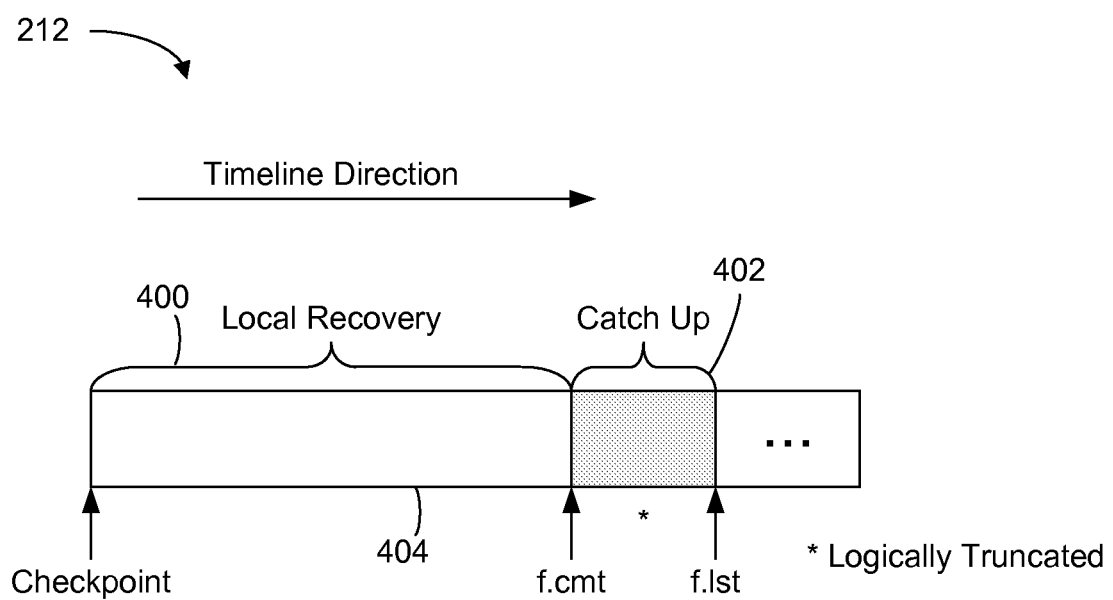
FIG. 4 depicts a schematic diagram of one embodiment of a log for a follower node during recovery.

FIG. 4 depicts a schematic diagram of one embodiment of a log 212 for a follower node 304 during recovery. In one embodiment, recovery of a follower node 304 includes two phases: the local recovery phase 400 and the catch up phase 402. In the local recovery phase 400, the follower node 304 may safely re-apply log records 404 from its most recent checkpoint through the follower node's last committed LSN 216 (f.cmt) to recover the state of its memtable 220. However, the state of writes after f.cmt is ambiguous, so the writes may not have been committed by the cohort's leader node 302. The state of these log records 404 is resolved during the catch up phase. If the follower node 304 has lost all its data because of a disk failure, the follower node 304 skips directly to the catch up phase 402.

In the catch up phase 402, the follower node 304 advertises f.cmt to the leader. The leader node 302 responds by sending all committed writes after f.cmt to the follower node 304. At the end of the catch up phase 402, the leader node 302 momentarily blocks new writes to ensure that the follower node 304 is fully caught up.

Because the state of writes after f.cmt are ambiguous and may not have been committed, additional operations may be taken to provide accurate recovery for these writes. One scenario in which additional measures may be taken is when a leader node 302 fails, a new leader node 302 is elected, and the new leader node 302 discards some of the log records 404 following f.cmt. The discarded log records 404, denoted by the asterisk in FIG. 4, may be removed from the follower node's log 212 to ensure that the discarded log records 404 are not reapplied by future invocations of local recovery.

Because the follower node's log 212 may be shared by multiple key ranges 106 (i.e. different cohorts 108), and some of the log records 404 following f.cmt may be required to recover another cohort 108, the follower node's log 212 may be logically truncated. The LSNs 216 of the log records 404 belonging to the follower between f.cmt and the last LSN 216 in its log 212 (f.lst) may be saved to a skipped-LSN list or other known location for future invocations of local recovery. In embodiments where the skipped-LSN list is expected to be small, the list may be loaded into memory before recovery. Skipped-LSN lists may be managed along with log files.

FIG. 5 depicts a flow chart diagram of one embodiment of a method 500 for updating a scalable row-store. Although the method 500 is described in conjunction with the scalable row-store system 100 of FIG. 1, embodiments of the method 500 may be implemented with other types of scalable row-store systems 100.

The scalable row-store system 100 receives 502 the update 214 to a key within a range 106 of keys in a distributed database table. The database table is distributed across nodes 102 in a cluster of computing devices. In one embodiment, the database table is distributed using a range partitioning scheme, such that each node 102 or cohort 108 may be responsible for different key ranges 106. In one embodiment, a cohort 108 includes three nodes 102 that are each responsible for a base key range 106 and the base key ranges 106 of the other two nodes 102 in the cohort 108. The replication of the key ranges 106 across all the nodes 102 within a cohort 108 may provide availability in case of failure of a node 102, and may help reduce the risk of losing data.

The row-store system 100 replicates 504 the update 214 across the nodes 102 in the cohort 108 corresponding to the key ranges 106 containing the updated key. The system 100 uses a consensus-based replication algorithm 230 to replicate the update 214 on the nodes 102. The replication algorithm 230 includes receiving 508 acknowledgement messages 226 from a majority of the nodes 102 within the cohort 108. Each acknowledgement message 226 indicates that the corresponding node 102 has received notification of the update 214. In some embodiments, the acknowledgement message 226 also indicates that the node 102 has performed certain operations, including writing the update proposal to a local log 212 and appending the update 214 to a commit queue 218.

In some embodiments, the replication algorithm 230 includes a replication factor 222 that determines a number of additional key ranges 106 for which each node 102 is responsible. The replication factor 222 may also determine how many nodes 102 are in each cohort 108.

In one embodiment, each cohort 108 includes a leader node 302 and several follower nodes 304. The leader node 302 receives the update 214 to the key, adds the update 214 to its local log 212, and appends the update 214 to a commit queue 218. The leader node 302 sends 506 a propose message 224 for the update 214 to the follower nodes 304 of the cohort 108, and the follower nodes 304 append the propose message 224 to their respective local logs 212 and to the commit queue 218. The follower nodes 304 send acknowledgement messages 226 to the leader node 302. The leader node 302 may also send itself an acknowledgement message 226. When the leader receives 508 acknowledgement messages 226 from the majority of the cohort 108, the leader node 302 modifies 510 the key in the memtable 220 at the leader node 302. The leader node 302 may also return a write message to the client 300 to indicate that the key has been updated successfully.

At any time after receiving the acknowledgement messages 226 from the majority of the cohort 108 and writing the update 214 to the leader node's memtable 220, the leader node 302 may send 512 an asynchronous commit message 228 to each of the follower nodes 304 to update 214 the key at the memtables 220 for each corresponding follower nodes 304. The commit message 228 may be sent to all of the follower nodes 304 in the cohort 108, even if the leader node 302 did not receive an acknowledgement message 226 from a given follower node 304.

In some embodiments, the row-store system 100 assigns the LSN 216 to each update 214 corresponding to a given key at the leader node 302 according to the order received from the client 300. The leader node 302 applies the updates 214 according to the LSN 216 and also proposes the updates 214 to each follower node 304 in order of LSN 216. The commit message 228 indicates to the follower nodes 304 to commit all of the updates 214 stored in their respective commit queues 218 up to a particular LSN 216. In one embodiment, the commit queue 218 also processes updates 214 for different keys in parallel.

In one embodiment, in response to the leader node 302 being disabled and a new leader node 302 being elected, the row-store system 100 removes log records from the local log 212 of a given follower node 304. The removed log records correspond to log records discarded by the leader node 302 between a last committed update 214 and a last LSN 216 in the local log 212. This may ensure that the discarded log records are not reapplied by future invocations of local recovery, which may improve consistency between log records for the follower nodes 304 in the row-store system 100.

An embodiment of a scalable row-store system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation for updating a scalable row-store.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. A computer readable storage medium or device is a specific type of computer-readable or -usable medium. Examples of a computer-readable storage medium include a semiconductor or solid state memory, magnetic tape, a removable computer diskette, a random access memory (RAM), a read-only memory (ROM), a rigid magnetic disk, and an optical disk. Hardware implementations including computer readable storage media also may or may not include transitory media. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
a non-transitory computer readable storage device to store a computer readable program, wherein the computer readable program, when executed by a processor within a computer, causes the computer to perform operations for updating a scalable row-store, the operations comprising:
receiving an update to a key within a range of keys in a database table, wherein the database table is distributed across nodes in a cluster of computing devices; and
replicating the update over a group of the nodes using a consensus-based replication algorithm,
wherein the replication algorithm comprises:
receiving the update to the key at a leader node of the group, wherein the leader node adds the update to a local log and appends the update to a commit queue;
sending the update appended to a propose message for the update to follower nodes of the group, wherein the follower nodes append the propose message and update to their respective local logs and to the commit queue;
receiving the acknowledgement messages at the leader node from the majority of the group;
modifying the key in the table at the leader node; and
sending an asynchronous commit message from the leader node to the follower nodes at any time after receiving the acknowledgement messages from the majority of the group, wherein each follower node writes the update to the table database at the follower node in response to the commit message.

2. The computer program product of claim 1, wherein the computer program product, when executed on the computer, causes the computer to perform additional operations, comprising:
assigning a log sequence number (LSN) to each update for a specific key at the leader node according to a received order; and
applying the updates at each follower node according to the LSN.

3. The computer program product of claim 1, wherein the computer program product, when executed on the computer, causes the computer to perform additional operations, comprising:
removing log records from the local log of the follower node in response to the leader node being disabled and a new leader node being elected, wherein the removed log records correspond to log records discarded by the leader node between a last committed update and a last LSN in the local log.

4. The computer program product of claim 1, wherein the commit queue processes updates for different keys in parallel.

5. The computer program product of claim 1, wherein the computer program product, when executed on a computer, causes the computer to perform additional operations, comprising:
  detecting failures in the nodes using a central coordination service, wherein the central coordination service is further configured to elect a new leader node for a cohort in response to a failure of the leader node.

6. A method for updating a scalable row-store, comprising:
  receiving an update to a key within a range of keys in a database table, wherein the database table is distributed across nodes in a cluster of computing devices; and
  replicating the update over a group of the nodes using a consensus-based replication algorithm,
  wherein the replication algorithm comprises:
    receiving the update to the key at a leader node of the group, wherein the leader node adds the update to a local log and appends the update to a commit queue;
    sending the update appended to a propose message for the update to follower nodes of the group, wherein the follower nodes append the propose message and update to their respective local logs and to the commit queue;
    receiving the acknowledgement messages at the leader node from the majority of the group;
    modifying the key in the table at the leader node; and
    sending an asynchronous commit message from the leader node to the follower nodes at any time after receiving the acknowledgement messages from the majority of the group, wherein each follower node writes the update to the table database at the follower node in response to the commit message.

7. The method of claim 6, further comprising:
  assigning a log sequence number (LSN) to each update for a specific key at the leader node according to a received order; and
  applying the updates at each follower node according to the LSN.

8. The method of claim 7, further comprising removing log records from the local log of the follower node in response to the leader node being disabled and a new leader node being elected, wherein the removed log records correspond to log records discarded by the leader node between a last committed update and a last LSN in the local log.

9. The method of claim 6, wherein the commit queue processes updates for different keys in parallel.

10. The method of claim 6, further comprising detecting failures in the nodes using a central coordination service, wherein the central coordination service is further configured to elect a new leader node for a cohort in response to a failure of the leader node.

11. A scalable row-store system, comprising:
  a database table distributed across a plurality of nodes in a cluster of computing devices;
  a replicator to replicate an update to a key within a range of keys in the database table over a group of the nodes using a consensus-based replication algorithm,
  wherein using the replication algorithm comprises:
    receiving the update to the key at a leader node of the group, wherein the leader node adds the update to a local log and appends the update to a commit queue;
    sending the update appended to a propose message for the update to follower nodes of the group, wherein the follower nodes append the propose message and update to their respective local logs and to the commit queue;
    receiving the acknowledgement messages at the leader node from the majority of the group;
    modifying the key in the table at the leader node; and
    sending an asynchronous commit message from the leader node to the follower nodes at any time after receiving the acknowledgement messages from the majority of the group, wherein each follower node writes the update to the table database at the follower node in response to the commit message.

12. The system of claim 11, wherein the replication algorithm is further configured to:
  assign a log sequence number (LSN) to each update for a specific key at the leader node according to a received order; and
  apply the updates at each follower node according to the LSN.

13. The system of claim 12, wherein the replication algorithm is further configured to remove log records from the local log of the follower node in response to the leader node being disabled and a new leader node being elected, wherein the removed log records correspond to log records discarded by the leader node between a last committed update and a last LSN in the local log.

14. The system of claim 11, further comprising a central coordination service configured to:
  detect failures in the nodes; and
  elect a new leader node for a cohort in response to a failure of the leader node.

\* \* \* \* \*